Nov. 24, 1970    R. E. ENNIS ET AL    3,542,747
CONTINUOUS PROCESS FOR CHLOROSULFONATION
AND CHLORINATION OF POLYETHYLENE
Filed May 7, 1968
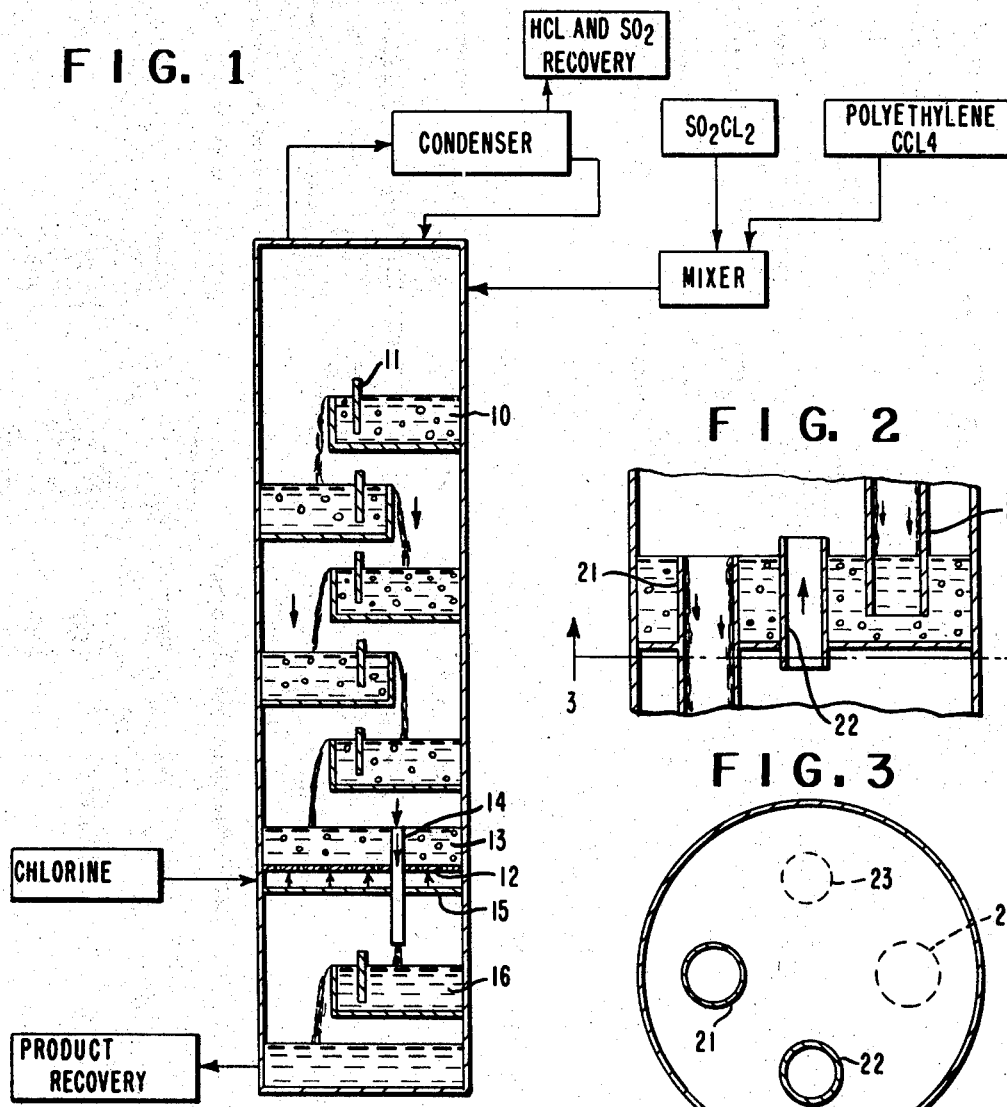
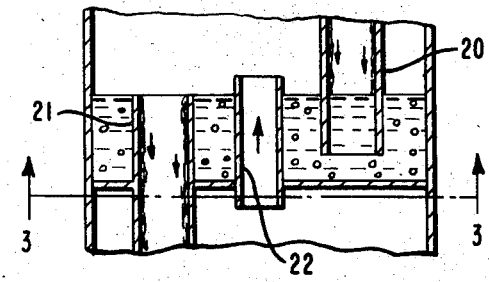
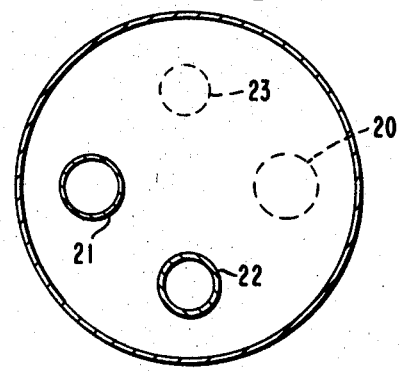
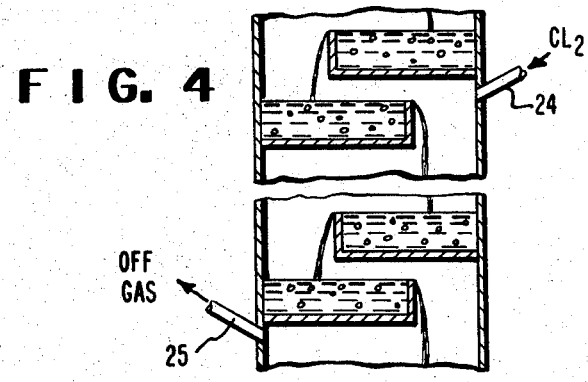
INVENTORS
ROYCE E. ENNIS
JOHN W. SCOTT
BY Francis A. Paintin
ATTORNEY 3,542,747
**CONTINUOUS PROCESS FOR THE CHLORO-
SULFONATION AND CHLORINATION OF
POLYETHYLENE**
Royce E. Ennis and John W. Scott, Beaumont, Tex., assignors to E. I. du Pont de Nemours and Company, Wilmington, Del., a corporation of Delaware
Continuation-in-part of application Ser. No. 643,506, June 5, 1967. This application May 7, 1968, Ser. No. 727,282
Int. Cl. C08f 27/06; C08d 3/14
U.S. Cl. 260—79.3          11 Claims

ABSTRACT OF THE DISCLOSURE

Continuous chlorination or chlorosulfonation of polyethylene in solvent solutions by feeding solution and sulfuryl chloride into one end of a column or pipe operated in both liquid and gas phase, and feeding chlorine up through the column. Free-radical initiators and chlorosulfonation catalysts can be present. Solvent-vaporized overhead is refluxed into the column to provide cooling.

CROSS REFERENCE TO RELATED APPLICATION

This application is a continuation-in-part of our co-pending application Ser. No. 643,506, filed June 5, 1967 now abandoned.

BACKGROUND OF THE INVENTION

Field of the invention

This invention relates to the chlorination and chlorosulfonation of polyethylene and, more particularly, to such processes utilizing sulfuryl chloride.

Description of the prior art

The use of sulfuryl chloride to effect either chlorination or chlorosulfonation of polyethylene is well known in the art as, for example, as set forth in McAlvey, U.S. Pats. 2,405,971 and 2,586,363. Moreover, continuous processes for the chlorosulfonation of polyethylene are known such as the ones set forth in Dixon et al., U.S. Pat. 3,296,222. It is highly desirable, however, to provide a continuous process which not only yields a homogeneous product, but is also capable of being conducted at moderate pressures and is not overly sensitive to reaction conditions necessitating expensive instrumentation and control devices.

SUMMARY OF THE INVENTION

In a continuous process for chlorosulfonating or chlorinating polyethylene in an elongated reaction zone having both a liquid phase and a gas phase, the improvement wherein an inert solvent solution of polyethylene and sulfuryl chloride are fed into one end of said zone in the presence of a free-radical generating catalyst, and chlorine is introduced near the other end of said zone.

BRIEF DESCRIPTION OF THE DRAWINGS

FIG. 1 is a schematic illustration of a flowsheet and column of the process of this invention.

FIG. 2 is a schematic sectional fragment of an alternative column plate design for use in the process of this invention.

FIG. 3 is a plan view of the plate of FIG. 2 taken along line 3—3.

FIG. 4 is a schematic sectional fragment of another column plate design for use in the process of this invention.

DESCRIPTION OF PREFERRED EMBODIMENTS

In both the chlorosulfonation and the chlorination of this invention, sulfuryl chloride is used. Chlorination, that is, the attachment of chlorine atoms along the polyethylene molecule in place of the hydrogen atoms originally present, takes place in both processes. Chlorosulfonation is the attachment of a —$SO_2Cl$ radical to the polyethylene molecule in significant amounts in addition to the chlorine. When speaking of chlorosulfonated polyethylene, the chlorine and sulfur contents are generally stipulated. For example, chlorosulfonated polyethylene usually contains from about 0.1 to 2 (preferably 0.7 to 1.5) weight percent sulfur and from about 15 to 60 (preferably 18 to 35) weight percent chlorine; however, higher or lower amounts can be present.

The type of polyethylene which can be utilized in the process of this invention can be either the linear, high-density type (e.g., 0.94 or higher) or can be the relatively low-density, branched-chain polyethylene. The polyethylene will preferably have a sufficiently high molecular weight to yield an elastomeric material upon chlorination or chlorosulfonation. The term "polyethylene" is also intended to include polymers of ethylene containing minor amounts of other ethylenically unsaturated monomers copolymerizable therewith, especially other lower alkenes such as propylene or butene-1, or other monomers such as acrylic or methacrylic acids. In general, neither the character of comonomer nor the polymer molecular weight should be such as to depress the solubility of the polymer in the desired solvent operating temperatures.

The polyethylene is first dissolved in a solvent; solution concentrations ranging from about 2 to 20 weight percent polyethylene are usually suitable. When branched-chain, low-density polyethylene is used, the preferred concentration is about 10 to 20 percent; however, when linear, high-density polyethylene is used, the preferred concentration is about 2 to 10 percent. The solvent should be relatively inert to reaction with chlorine, sulfuryl chloride or free radicals and it should be a fairly good solvent for the polyethylene being reacted. Carbon tetrachloride is preferred; however, solvents such as benzene, chlorinated benzenes, chloroform, tetrachloroethane or dichlorofluoromethane can be used. Chlorotrifluoromethane is less preferred because of its solubility characteristics.

The reaction takes place in an elongated reaction zone. Typically, this is a vertical column with a plurality of plates or stages which provide a holdup or residence time for the liquid reactants as they proceed through the column. In this type of column, at least about six stages are preferred. However, the reaction zone need not be a vertical column with plates; it can even be a horizontal pipe or the like. The solvent solution of polyethylene and the sulfuryl chloride are both introduced into one end of the reaction zone, and chlorine is introduced into contact with the liquid near the other end of the reaction zone. It should be understood that the term "reaction zone" is not necessarily co-extensive with the size of the column or pipe in which the reaction is carried out. For example, the process might be carried out in a twenty-plate column; however, the effective reaction zone might be only the top half of the column with the bottom ten plates merely being surplussage. In this case, if the polyethylene solution and the sulfuryl chloride were introduced into the top and chlorine were introduced into the eighth plate down from the top, the chlorine still would be introduced near the bottom of the reaction zone although there are twelve plates between there and the bottom of the column itself. Additional chlorine may be introduced into the gas phase and at other locations nearer the top of the column if desired. Multiple chlorine inlets along the length of the column allow more control of the reaction rates up the column. These can be used to prevent an excess of unreacted sulfuryl chloride from arriving at the bottom plate. Further, appropriate reaction control will minimize heterogeneity.

In preferred operation for chlorosulfonation, the polymer solution and the sulfuryl chloride are introduced at a temperature of about 100° C. to 115° C. which means that the end of the reaction zone where they are introduced will be approximately this temperature. It is also preferred that the point in the reaction zone at which the chlorine is introduced is maintained at about 80° C. to 90° C. A minimum temperature in the zone of about 60° C. is probably necessary if a free-radical catalyst is being used. If it is desired only to chlorinate the polyethylene with a minimum of chlorosulfonation taking place, temperatures above about 100° C. throughout the entire system are preferred.

The pressure in the system should be such that the hydrogen chloride and the sulfur dioxide by-products from the reaction are able to evolve as gas bubbles. Moreover, the reactor in which the reaction is conducted should be designed so as to permit these gases to escape from the solution easily.

The presence of some sort of free-radical initiator is required to initiate the process which produces active sites on the polyethylene molecule for both chlorination and chlorosulfonation. Typical of such free-radical initiators are azobis(cyanoalkanes) such as $\alpha,\alpha'$-azobisisobutyronitrile, azodicyclohexenecarbonitrile, and 2-(2'-hydroxyethylazo)-2,4-dimethylvaleronitrile, and organic peroxides such as lauroyl peroxide or ditertiarybutyl peroxide. The presence of light, especially ultraviolet light, can act as a free-radical initiator. See U.S. Pats. 2,405,971; 2,503,252, and 2,586,363.

The chlorosulfonation reaction is enhanced if a catalyst is present such as certain tertiary amines, e.g., pyridine, quinoline, quinaldine, nicotine, piperidine, dimethylaniline, tributylamine, and certain sulfhydryl compounds such as 2-mercaptothiazoline, and allyl thiourea, and amides such as dimethyl formamide or acetamide. [See Karasch et al., J. Am. Chem. Soc., 61, 2142, 3098 and 2432 (1939) and U.S. Pat. 2,383,319.]

In chlorosulfonating in accordance with this invention, the reaction proceeds rapidly in the top spaces of the column where the concentration of sulfuryl chloride is relatively high. The addition of chlorine near the bottom accelerates the chlorosulfonation there where otherwise the sulfuryl chloride concentration would be so low that the reaction rate might drop too severely. Accordingly, the reaction rate throughout the column is kept fairly constant. In addition, the introduction of chlorine at the bottom of the column helps eliminate sulfuryl chloride from the product-containing effluent stream. This is an advantage because sulfuryl chloride is relatively difficult to remove from that stream, whereas chlorine is not. Alternatively, as previously indicated, multiple chlorine inlets along the length of the column can be used to effect greater reaction control.

At temperatures at above about 100° C., the chlorination reaction is so favored that the chlorosulfonation reaction may not even occur. The amount of sulfuryl chloride that can be added per pound of polyethylene can vary widely depending not only on column operating conditions, but on the particular amount of chlorination or chlorosulfonation that is desired. The amount of chlorine added to the column will be at least about 0.08 part (preferably at least about 0.1 part) per part of sulfuryl chloride fed to the column. Technically, there is no upper limit on the amount of chlorine; however, not more than about 0.5 part of chlorine per part of sulfuryl chloride will ordinarily be used.

During operation of the column, the overhead that is fed into a condenser will be sulfur dioxide, hydrogen chloride, and solvent with small amounts of chlorine and sulfuryl chloride. Most of the hydrogen chloride and some of the sulfur dioxide passes through the condenser without condensing and is sent to be recovered by means known to those skilled in the art. The solvent, sulfuryl chloride, sulfur dioxide and chlorine are cooled and returned to the column as a liquid stream. The operation of this condenser, plus evaporation of solvent and other gases, is a means for removing the heat of reaction of the column.

Referring now to the drawings, a typical multistage column is illustrated in FIG. 1 wherein each stage 10 is a tray which overflows onto the stage below. In addition, each stage has a baffle 11 which prevents the liquid freshly received on the stage from flowing off until after a suitable holdup time. As depicted, the chlorine is fed near the bottom of the column and sparged up through a perforated plate 12 through the liquid stage 13. The latter overflows through downcomer 14, located in solid plate 15, onto stage 16. Alternatively, the plate 15 can be omitted and the downcomer 14 may be immersed in the liquid on plate 16, thus forcing the gas through the perforations in plate 12. It is possible that some or even all of the baffle trays can be replaced by perforated plates or sieves such as plate 12 to improve efficiency.

An alternative stage construction is illustrated in FIGS. 2 and 3. Each stage is fed by a downcomer 20 from the stage above, the liquid overflowing into downcomer 21. The gas in the column passes upward through vent tube 22 and vent tube 23 of the next stage above. These are staggered as indicated in FIG. 3.

Another alternative stage construction is illustrated in FIG. 4. One or more chlorine inlets 24 along the length of the column can be provided to conduct chlorine into the gas phase to effect greater reaction control. One or more off-gas outlets 25 can be present along the column length to inhibit flooding and permit directioning of the chlorine gas flow. Further details are furnished in Example 7. The center portion of the column is shown fragmented to indicate that the chlorine inlets 24 and off-gas outlets 25 need not occur at precise stage intervals.

This invention will now be described with reference to the following examples of specific embodiments thereof wherein all parts and percentages are by weight unless otherwise specified.

EXAMPLE 1

A reactor similar to that in FIG. 1 is used in the preparation with the design of each stage being that of FIGS. 2 and 3. The reactor consists of 12 stages, each 2 inches in diameter and 2 inches high. The liquid enters each plate through a ½ inch diameter downcomer from the stage above and is removed by overflowing to the stage below by a similar downcomer set 1 inch above the bottom of the stage. The bottom of the downcomer enters the next lower stage below the liquid level. Vapor flows upward through vent tubes which project from the bottom plate of each stage through the solution of the stage. The cross-section of the vapor vents is progressively increased from the bottom toward the top of the reactor. The outside of the reactor is maintained at a temperature very close to the reaction temperature (85° C. at 25 p.s.i.g.) so that the reaction is nearly isothermal. The top plate of the reactor is fed by a mixture of two solutions. The first solution contains 100 parts of low-density polyethylene ("Alathon 3033," commercially available from E. I. du Pont de Nemours and Company), 740 parts of carbon tetrachloride, 0.16 part of pyridine, and 0.024 part of a poly dimethyl siloxane and is fed at a rate of 330 grams per minute. The temperature of this feed stream is maintained above the solution temperature of the polyethylene. Before entering the reactor, this stream is intimately mixed with a second stream consisting of 100 parts of sulfuryl chloride and 0.018 part of $\alpha,\alpha'$-azobisisobutyronitrile which is fed at a rate of 62 grams per minute. This mixture reacts as it flows down the column from one plate to another. Chlorine gas is sparged under the surface of the liquid in the bottom stage at the rate of 7 grams per minute (a stage such as 16 being absent). The vapor from the top of the reactor is vented to a reflux condenser. The return condensate is heated to about 90° C. to 100° C. by the up-flowing vapor and is mixed with fresh feed polyethylene solution. A solution level is maintained in the bottom of the reactor above an exit valve. As the solution goes through the valve, most of the dissolved product gases ($SO_2$ and HCl) are evolved along with $CCl_4$ vapor. The resulting solution is relatively free of acidic gas. The product solution can then be stabilized by adding suitable amounts of a stabilizer against oxidation at room temperature, and the polymer isolated by conventional means. The product typically contains about 29.1% combined chlorine and 1.51% combined sulfur and is found to be a useful rubbery material when properly compounded and cured.

EXAMPLE 2

The reactor in Example 1 is modified by moving the chlorine inlet up from the bottom (12th) stage to the 8th stage from the top, leaving four stages, such as 16 of FIG. 1, below the chlorine inlet. The reaction pressure is 25 p.s.i.g. and the temperature 88° C. The top plate of the reactor is fed with a mixture of two solutions. The first solution contained 100 parts of high-density polyethylene ("Alathon 7035"), 2850 parts of $CCl_4$, 0.31 part of pyridine and 0.092 part of poly dimethyl siloxane and is fed at a rate of 304 grams per minute. The temperature of this feed stream is maintained above 100° C. Before entering the reactor, this stream is intimately mixed with a second stream consisting of 100 parts of sulfuryl chloride and 0.0018 part of $\alpha,\alpha'$-azobisisobutyronitrile which is fed at a rate of 27 grams per minute. The solution reacts as it flows down the column from one plate to another. Chlorine gas is sparged under the surface of the liquid in the 8th stage of the reactor at a rate of 4.2 grams per minute. The rest of the process for this example follows that given in Example 1. The final product typically contains about 36% combined chlorine and 1.0% to 1.2% combined sulfur. When properly compounded and cured, it is found to be a useful elastomer. If a wider diameter column (e.g., 3-inch) is used, a more concentrated linear polyethylene solution, e.g., about 8 percent, can be used.

EXAMPLE 3

The reactor and stage design used in the preparation is similar to that in FIG. 1 and consists of ten stages, each 3 inches in diameter except for the first (at the top) which is 2 inches in diameter. The total height of each stage is 4 inches. The liquid overflows the dam on each stage to the stage below as shown. The dams are 1¾ inches high except for the first two which are 1 inch high. The bottom stage is a perforated plate through which chlorine is introduced (stage 16 is omitted). The liquid above this plate overflows a tubular downcomer to the receiver below this last stage. The overflow height on this stage is 1½ inches. The chlorine introduced below this plate is saturated with $CCl_4$ at 100° C. and 25 p.s.i.g. to prevent drying out polymer in the perforations of the plate. Some chlorine is fed directly to the vapor space above the bottom plate so that it will diffuse into the liquid and react, causing the $SO_2Cl_2$ to be completely consumed. The rate of absorption of chlorine into the liquid phase decreases with the decreasing concentration in the gas phase at progressively higher stages in the reactor. This tends to counteract the decreasing rate of reaction toward the bottom due to the lowering of the $SO_2Cl_2$ concentration. The reaction pressure is 30 p.s.i.g. and the temperature 91° C. The top plate of the reactor is fed with a mixture of two solutions. The first solution contains 100 parts of low-density polyethylene ("Alathon 3033"), 740 parts of $CCl_4$, 0.08 part of pyridine and 0.022 part of a poly dimethyl siloxane and is fed at a rate of 330 grams per minute. The temperature of this feed stream is maintained above the solution temperature of the polyethylene. Before entering the reactor, this stream is intimately mixed with a second stream consisting of 100 parts of $SO_2Cl_2$ and 0.18 part of $\alpha,\alpha$-azobisisobutyronitrile which is fed at a rate of 46 grams per minute. The solution passes from one stage to another by gravity, the vapor passing upward. Chlorine gas is introduced into the 10th (bottom) stage at the rate of 10 grams per minute by the means described above. The product solution contains no easily detectable amount of $SO_2Cl_2$, probably being less than 0.01%. The polymer typically contains about 27.2% combined chlorine and 1.4% to 1.5% combined sulfur. When properly compounded and cured, the polymer is found to be a useful elastomer. In this example, the method of maintaining temperature conditions, the disposition of off-gas and degassing of product solution is the same as in Example 1.

EXAMPLE 4

To produce a chlorinated polyethylene containing combined chlorine but a minimum number of sulfuryl chloride side groups ($-SO_2Cl$), the following procedure can be used. Equipment similar to that described in Example 3 is used, modified only as necessary to operate at a pressure of about 60 p.s.i.g. and a temperature of 110° C. The higher temperature decreases the rate of formation of $R-SO_2Cl$. The top plate is fed with a mixture of two solutions. The first solution consists of 100 parts of low-density polyethylene, 740 parts of $CCl_4$, 0.008 part of pyridine and 0.022 part of poly dimethyl siloxane. The lower concentration of pyridine results in less chlorosulfonation. This solution is fed at a rate of 330 grams per minute. The second solution consists of 100 parts of $SO_2Cl_2$ and azodicyclohexane carbonitrile probably in the range of 0.001 to 0.00001 part and is fed at a rate of 34.4 grams per minute. Chlorine is introduced at the 10th stage from the top at a rate of 7.6 grams per minute. The polymer typically contains approximately 24% combined chlorine and is a useful resin which can be compounded and cured by means known in the art. The methods of (1) maintaining temperature conditions, (2) disposition of off-gas, and (3) degassing of the product solution are the same as in Example 3.

EXAMPLE 5

The polyethylene dissolver is a 1,000-cc., jacketed, stirred flask which is wrapped with foil to exclude light. The flask is fitted with a stopcock on the bottom outlet which is used to control polymer solution flow through the reaction zone. The reactor consists of a West-type condenser (having a very irregular inner wall with multiple indentations) which is erected in a vertical position. The top of the condenser is fitted with a spherical device to prevent polymer solution from short circuiting through the reaction zone. The bottom of the condenser extends into a collection pan and makes a liquid seal with carbon tetrachloride in the pan. A tube is entered through the bottom of the condenser to admit chlorine gas into the reaction zone. The entire reaction zone is illuminated with actinic light. Eighty grams of a polyethylene having a density of about 0.92 and a melt index of about 10 is dissolved in 1000 grams of carbon tetrachloride at atmospheric pressure and 76° C. One hundred and ten grams of sulfuryl chloride is then added to the polyethylene solution. Chlorine is introduced through the bottom of the reactor at a rate of 20 grams per hour. The polyethylene, sulfuryl chloride-carbon tetrachloride mixture is introduced into the top of the reactor at a rate of 5 grams of polyethylene per minute. Vigorous bubbling in the reaction zone indicates reaction of the sulfuryl chloride and chlorine with the polyethylene.

The final product typically contains about 22.8% combined chlorine and 0.42% combined sulfur. The product is a useful resin and completely soluble in carbon tetrachloride.

EXAMPLE 6

The polyethylene dissolvers are 2,000-cc., jacketed flasks fitted with stirrers and a bottom outlet. The metering pump is a traced piston type pump. The mixing vessel is a 500-cc., jacketed and stirred flask. Sulfuryl chloride is metered into the bottom of the mixing vessel through a rotameter. The reactor consists of a fused silica tube ½ inch in diameter and 26 inches long mounted horizontally. Chlorine gas is introduced into the reactor beneath the liquid level at either end. Actinic light or the azo catalyst of Example 1 may be used as a catalyst for the reaction. When azo catalyst is used, it is added to the first part of the reactor. When actinic light is used as an initiator, two 275-watt sun lamps are placed 6 inches from the bottom of the reactor tube.

All piping and vessels containing polyethylene solution are kept at 70° C. by hot water jacketing to prevent separation of the solids. The reactor is maintained at 70° C. by the use of hot-air blowers. The reactor liquid level is maintained at about half full by means of a dam at the end of the tube. The system is run at essentially atmospheric pressure.

Using carbon tetrachloride as a solvent throughout, branched polyethylene of density 0.92 and melt index of 10 is supplied as an 8.5% solution at 70° C. at a rate of 2.06 grams per minute to the mixing vessel. Sulfuryl chloride is supplied to the mixing vessel at a rate of 3.3 grams per minute. When azo catalyst is used, it is supplied to the reactor as a 10% solution in chloroform at a rate of 0.01 gram per minute. Chlorine gas is supplied to the reactor at a rate of 0.28 gram per minute. Vigorous bubbling in the reactor is an indication of reaction. Product collected at the end of the reactor typically contains about 27.7% combined chlorine and 1.41% combined sulfur and is completely soluble in carbon tetrachloride. Vulcanizate properties of the product are about equivalent to batch-produced polymer from the same type of polyethylene and at equal chlorine and sulfur content.

EXAMPLE 7

The reactor and stage design used in the preparation are similar to that in FIGS. 1 and 4 and consist of 24 stages each 3 inches in diameter and 1½ inches high. The dams are ¼ inch high and no baffle is used. Liquid flows by gravity from one plate to the next. The bottom stage is a perforated plate 12 through which chlorine is introduced without a stage 16 thereunder. The liquid from this stage is usually maintained at a level substantially above the top of an exit line from the reactor. The total height of liquid on this plate is 3 to 4 inches. Chlorine is also introduced to the vapor space above plates four, ten, sixteen and twenty-two counting from the top. Off-gases and CCl$_4$ vapor are withdrawn from the vapor space above plates one, seven, thirteen and nineteen. This arrangement allows control of the reaction rate profile down the column. The multiple gas exits reduce flooding. Chlorine gas entering the column at intermediate locations may be forced to go up or down depending on how valves in the off-gas lines are throttled. In other words, the pressure gradient down the column is controllable. Chlorine entering the column at plates ten, sixteen and twenty-two and the perforated plate is saturated with CCl$_4$ at 20 p.s.i.g. and 100° C. to prevent drying out polymer skins and plugging. The rate of chlorine fed to multiple inlets is higher, generally, toward the bottom of the column to compensate for the decreasing concentration of SO$_2$Cl$_2$. The reaction pressure is 20 p.s.i.g. and the temperature is 82° C. Three liquid streams are mixed and fed to the top plate of the reactor. The first stream consists of 100 parts of linear polyethylene (similar to "Alathon" 7035), 1230 parts of CCl$_4$, 0.12 part of pyridine and 0.076 part of a polydimethyl siloxane and is fed at a rate of 330 grams per minute. The second stream consists 37.4 grams per minute of SO$_2$Cl$_2$. The third stream consists of 100 parts of $\alpha,\alpha'$-azobisisobutyronitrile, 6350 parts CCl$_4$ and 1490 parts CHCl$_3$ and is fed at a rate of 63.6 grams per minute. The total feed rate of Cl$_2$ gas is 20 grams per minute.

The exit stream typically contains 0.3% residual SO$_2$Cl$_2$ and the polymer typically contains 34% combined chlorine and 1% combined sulfur. When stabilized, isolated, compounded and cured, this product is a useful elastomer and is completely soluble in carbon tetrachloride. The residual unreacted SO$_2$Cl$_2$ could probably be greatly reduced if not entirely eliminated by the addition of one or two more stages of perforated (or sieve) plates.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

We claim:
1. In a continuous process for chlorosulfonating or chlorinating polyethylene in an elongated reaction zone having both a liquid phase and a gas phase, the improvement wherein an inert solvent solution of polyethylene and sulfuryl chloride is fed into one end of said zone, in the presence of a free-radical initiator, and chlorine is introduced near the other end of said zone.

2. A process as defined in claim 1 wherein said reaction zone is maintained at pressures such that the sulfur dioxide and the hydrogen chloride formed during the reaction can continuously pass through said liquid phase into said gas phase.

3. A process as defined in claim 1 wherein said reaction zone contains catalytic amounts of a tertiary amine chlorosulfonation catalyst.

4. A process as defined in claim 1 wherein said solution contains about 2 to 20 weight percent polyethylene and the amount of chlorine is at least about 0.08 part, per weight part of sulfuryl chloride.

5. A process as defined in claim 1 wherein additional amounts of chlorine are introduced along the length of the elongated reaction zone.

6. A process as defined in claim 5 wherein off-gas is removed at points along the length of the elongated reaction zone.

7. A continuous process for the chlorosulfonation of polyethylene in an elongated reaction zone having both a liquid phase and a gas phase, and being maintained at a pressure of about 25 to 100 p.s.i.g. wherein (a) sulfuryl chloride and (b) an inert solvent solution containing about 2 to 20 weight percent polyethylene, a free-radical initiator and a tertiary amine chlorosulfonation catalyst are fed into one end of said zone, the temperature of which is about 100° C. to 115° C., and (c) at least 0.1 part of chlorine, per weight part of sulfuryl chloride, is introduced through the liquid phase near the other end of said zone, the temperature of which is about 80° C. to 90° C.

8. A process as defined in claim 7 wherein said solvent is carbon tetrachloride.

9. A process as defined in claim 7 wherein said elongated reaction zone is a vertical column having at least six plates, and wherein said solution and sulfuryl chloride are introduced at the top of said column and said chlorine is introduced below the middle of said column.

10. A process as defined in claim 7 wherein said free-radical initiator is α,α'-azobisisobutyronitrile and said chlorosulfonation catalyst is pyridine.

11. A process as defined in claim 9 wherein a plurality of chlorine inlets and off-gas exits are provided along the length of said column toward the top.

References Cited

UNITED STATES PATENTS

| | | | |
|---|---|---|---|
| 2,462,730 | 2/1949 | Detrick | 204—163 |
| 2,762,683 | 9/1956 | Massey | 23—1 |
| 2,981,720 | 4/1961 | Herzberg | 260—79.3 |
| 3,052,990 | 9/1962 | Tailor | 34—57 |
| 3,299,014 | 1/1967 | Kalil | 260—79.3 |
| 3,347,835 | 10/1967 | Lorenz | 260—79.3 |

JOSEPH L. SCHOFER, Primary Examiner

C. A. HENDERSON, Jr., Assistant Examiner

U.S. Cl. X.R.

23—283; 204—159.17; 260—94.9, 96